United States Patent
Rapaport et al.

(10) Patent No.: US 12,489,874 B2
(45) Date of Patent: Dec. 2, 2025

(54) STEREOSCOPIC CAPTURE USING CAMERAS WITH DIFFERENT FIELDS OF VIEW

(71) Applicant: Apple Inc., Cupertino, CA (US)

(72) Inventors: Guy Rapaport, Liman (IL); Zejing Wang, Mountain View, CA (US); Vicky Kogan, Ramat Gan (IL); Mohammad Nassar, Haifa (IL); Aaron Wetzler, Rishon LetZion (IL); Ziv Hendel, Herzliya (IL); Tobias Rick, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/645,357

(22) Filed: Apr. 24, 2024

(65) Prior Publication Data

US 2024/0406361 A1 Dec. 5, 2024

Related U.S. Application Data (60) Provisional application No. 63/505,350, filed on May 31, 2023.

(51) Int. Cl.
| | |
|---|---|
| *H04N 13/122* | (2018.01) |
| *H04N 13/167* | (2018.01) |
| *H04N 13/239* | (2018.01) |
| *H04N 13/246* | (2018.01) |
| *H04N 23/60* | (2023.01) |
| *H04N 23/61* | (2023.01) |

(52) U.S. Cl.
CPC ........ *H04N 13/122* (2018.05); *H04N 13/167* (2018.05); *H04N 13/239* (2018.05); *H04N 13/246* (2018.05); *H04N 23/61* (2023.01); *H04N 23/64* (2023.01)

(58) Field of Classification Search
None
See application file for complete search history.

(56) References Cited

U.S. PATENT DOCUMENTS

| | | |
|---|---|---|
| 8,274,552 B2 | 9/2012 | Dahi et al. |
| 8,896,667 B2 | 11/2014 | Jin |
| 8,982,181 B2 | 3/2015 | Newbery |
| 9,445,081 B1 | 9/2016 | Kouperman et al. |
| 9,762,800 B2 | 9/2017 | Tsubaki |
| 10,523,917 B2 | 12/2019 | Zeng et al. |
| 10,911,737 B2 | 2/2021 | Dahi et al. |

(Continued)

FOREIGN PATENT DOCUMENTS

CN      113596322 A      11/2021

*Primary Examiner* — Eileen M Adams
(74) *Attorney, Agent, or Firm* — Treyz Law Group; Jason Tsai (57) ABSTRACT

An electronic device is provided that includes a first camera with a first field of view configured to capture a first image, a second camera with a second field of view configured to capture a second image, and control circuitry configured to output stereoscopic content based on the first and second images. The control circuitry can include image signal processors configured to process the first and second images, additional processors for performing stereo rectification and image stabilization on the first and second images, and a compression block for combining images output from the additional processors.

25 Claims, 8 Drawing Sheets

(56) References Cited

U.S. PATENT DOCUMENTS

| | | | |
|---|---|---|---|
| 11,190,689 B1* | 11/2021 | Wang | H04N 23/683 |
| 2002/0163581 A1* | 11/2002 | Kitazawa | H04N 23/687 |
| | | | 348/208.6 |
| 2011/0249100 A1* | 10/2011 | Jayaram | H04N 13/239 |
| | | | 348/48 |
| 2015/0215599 A1* | 7/2015 | D'Amato | H04N 13/161 |
| | | | 348/42 |
| 2019/0251394 A1* | 8/2019 | Sandhan | G06V 10/761 |
| 2021/0272285 A1* | 9/2021 | Meglan | A61B 1/00193 |
| 2022/0350225 A1* | 11/2022 | Kawanago | G03B 33/16 |
| 2023/0141515 A1* | 5/2023 | Danziger | H04N 13/122 |
| | | | 348/47 |

* cited by examiner

STEREOSCOPIC CAPTURE USING CAMERAS WITH DIFFERENT FIELDS OF VIEW

This application claims the benefit of U.S. Provisional Patent Application No. 63/505,350, filed May 31, 2023, which is hereby incorporated by reference herein in its entirety.

FIELD

This relates generally to electronic devices, and, more particularly, to electronic devices with cameras.

BACKGROUND

Electronic devices can include one or more cameras for capturing an image or a video feed of scene. Electronic devices can include a wide camera having a first field of view, an ultrawide camera having a second field of view that is greater than the first field of view, and a telephoto camera having a third field of view that is smaller than the first field of view.

SUMMARY

An electronic device may include one or more cameras for capturing an image or a video feed of a real-world environment. The electronic device can include a wide image sensor configured to capture corresponding wide images, a ultra wide image sensor configured to capture corresponding ultra wide images, and control circuitry for processing and combining the wide images with the ultra wide images to generate stereoscopic images.

An aspect of the disclosure provides a method of operating an electronic device that includes capturing a first image using a first image sensor having a first field of view, capturing a second image using a second image sensor having a second field of view different than the first field of view, and outputting stereoscopic content based on the first image captured using the first image sensor with the first field of view and the second image captured using the second image sensor. The method can include processing the first image using a first image signal processor to output a first processed image and processing the second image using a second image signal processor to output a second processed image. The method can include performing stereo rectification and image stabilization operations on the first and second processed images to output corresponding first and second rectified and stabilized images and compressing the first and second rectified and stabilized images using a multiview video encoding scheme to generate a stereoscope video stream. The method can include obtaining stabilization information for the first image sensor and synchronizing image stabilization between the first and second image sensors by applying the stabilization information for the first image sensor to the second processed image captured using the second image sensor. The method can include obtaining a rotation matrix associated with the first image sensor, calculating a rectified and stabilized pose based on the rotation matrix and motion data associated with the first image sensor, rectifying a pose of the first image sensor, and stabilizing the rectified posed of the first image sensor using a temporal filter.

The method can further include calculating a first homography based on the rectified and stabilized pose, the motion data associated with the first image sensor, intrinsic data associated with the first image sensor, and intrinsic data associated with a target image sensor and calculating a second homography based on the rectified and stabilized pose, motion data associated with the second image sensor, intrinsic data associated with the second image sensor, and the intrinsic data associated with the target image sensor. The method can include warping the first processed image using the first homography to generate the first rectified and stabilized image and warping the second processed image using the second homography to generate the second rectified and stabilized image. The method can further include generating a still stereoscopic pair.

An aspect of the disclosure provides an electronic device that includes a first camera having a first field of view and configured to capture a first image, a second camera having a second field of view different than the first field of view and configured to capture a second image, and control circuitry configured to output stereoscopic content based on the first image captured from the first camera having the first field of view and the second image from the second camera having the second field of view different than the first field of view. The control circuitry can include: a first image signal processor configured to receive the first image captured by the first camera and to output a corresponding first processed image, a second image signal processor configured to receive the second image captured by the second camera and to output a corresponding second processed image, a first additional processor configured to receive the first processed image, motion data associated with the first camera, and first calibration data and further configured to generate a first rectified and stabilized image, a second additional processor configured to receive the second processed image, motion data associated with the second camera, and second calibration data and further configured to generate a second rectified and stabilized image, and a video compression block configured to receive the first and second rectified and stabilized images and to generate a corresponding stereoscopic video stream. The electronic device can further include circuitry for outputting still images.

An aspect of the disclosure provides a method of operating an electronic device that includes capturing a first image using a first camera with a first field of view, capturing a second image using a second camera with a second field of view different than the first field of view, generating stereoscopic content based on the first and second captured images, and outputting a user notification to improve a quality of the stereoscopic content. The method can include detecting an incorrect stereoscopic capture orientation of the electronic device and then outputting a user notification to switch to a correct stereoscopic capture orientation. The method can include detecting whether the first camera is occluded and then outputting a user notification that the first camera is occluded. The method can include detecting a lighting condition of the first or second image and then outputting a user notification that the lighting condition is below the threshold. The method can include detecting an external object within the field of view of the first camera and then outputting a user notification that the external object is within the field of view of the first camera. The method can include detecting motion or jitter of the first and second cameras and then outputting a user notification to stop moving or hold still.

DETAILED DESCRIPTION

Figure 1:
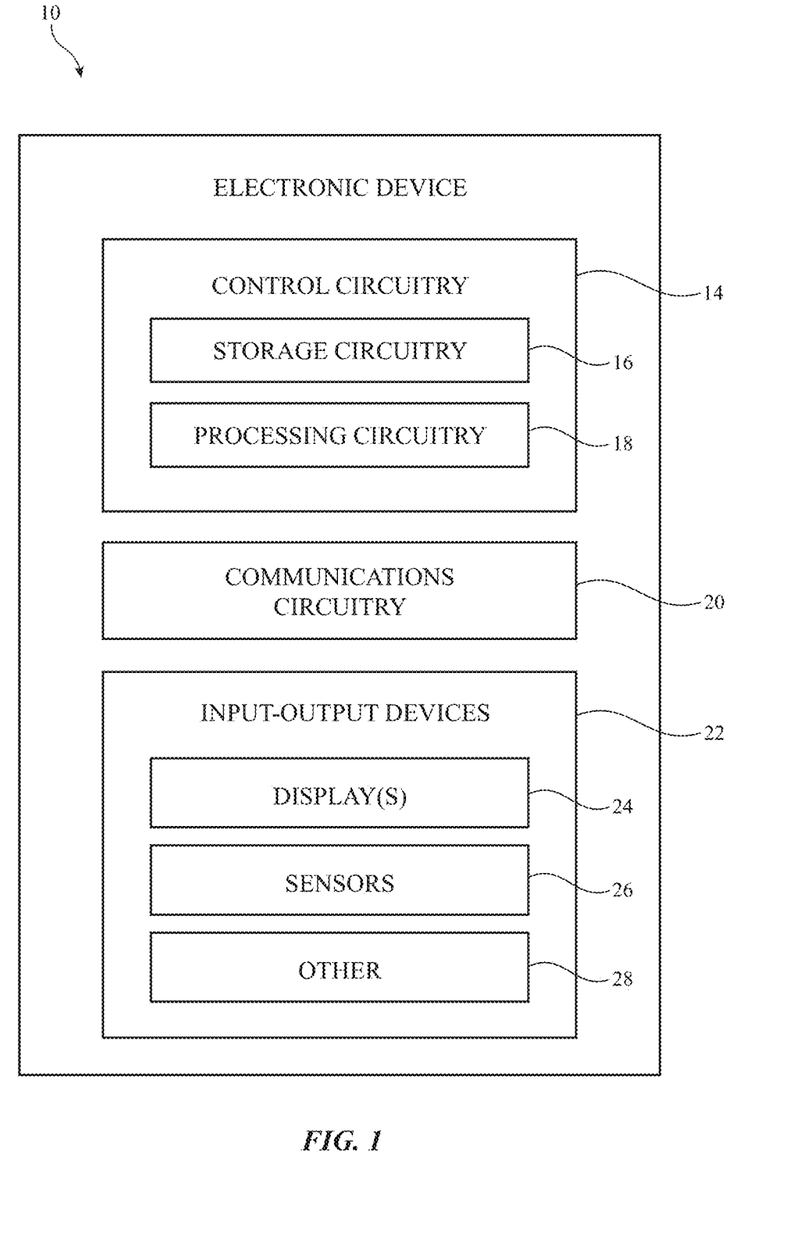
FIG. 1 is a schematic diagram of an illustrative electronic device in accordance with some embodiments.

An electronic device that includes multiple cameras configured to capture a stereoscopic video and/or image is provided. For example, a wide camera and an ultra wide camera on a cellular telephone can be used to capture stereoscopic content. A schematic diagram of an illustrative electronic device 10 configured to capture stereoscopic content is shown in FIG. 1. Device 10 of FIG. 1 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections) and/or may be used to receive such information from external electronic devices. Each of these external devices may include components of the type shown by device 10 of FIG. 1.

As shown in FIG. 1, electronic device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), power management units, audio chips, etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultrawideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

To support communications between device 10 and external equipment, control circuitry 14 may communicate using communications circuitry 20. Communications circuitry 20 may include antennas, radio-frequency transceiver circuitry, and other wireless communications circuitry and/or wired communications circuitry. Communications circuitry 20, which may sometimes be referred to as part of control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link.

Communications circuitry 20 may transmit and/or receive radio-frequency signals within a corresponding frequency band at radio frequencies (sometimes referred to herein as a communications band or simply as a "band"). The frequency bands handled by communications circuitry 20 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHZ), and/or other Wi-Fi® bands (e.g., from 1875-5160 MHZ), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHZ), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Device 10 may, if desired, include power circuits for transmitting and/or receiving wired and/or wireless power and may include batteries or other energy storage devices. For example, device 10 may include a wireless power coil and a rectifier to receive wireless power that is provided to other circuitry in device 10.

Device 10 may include input-output devices such as input-output devices 22. Electronic components such as input-output devices 22 may be used in gathering user input, in gathering information on the environment surrounding the user, and/or in providing a user with output. Input-output devices 22 may include one or more displays such as display 24. Display 24 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Input-output devices 22 may also include sensors 26. Sensors 26 in input-output devices 22 may include image sensors (e.g., visible light cameras, infrared cameras, cameras that are sensitive at multiple wavelengths, three-dimensional camera systems such as depth sensors, structured light sensors and/or depth sensors based on stereo imaging devices that capture three-dimensional images, time-of-flight cameras, etc.), force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 26 may include optical sensors such as optical sensors that emit and detect light, ultrasonic sensors, optical touch sensors, optical proximity sensors, and/or other touch sensors and/or proximity sensors, monochromatic and color ambient light sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, optical sensors such as self-mixing sensors and light detection and ranging (lidar) sensors, humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, and/or other sensors.

In some arrangements, device 10 may use sensors 26 and/or other input-output devices 22 to gather user input. For example, input-output devices 22 such as buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

Input-output devices 22 may include optical components such as depth sensors (e.g., structured light sensors or other sensors that gather three-dimensional image data), optical proximity sensors, ambient light sensors (e.g., color ambient light sensors), optical time-of-flight sensors and other sensors 16 that are sensitive to visible and/or infrared light and that may emit visible and/or infrared light (e.g., devices 22 may contain optical sensors that emit and/or detect light). For example, a visible light image sensor in a camera may have a visible light flash or an associated infrared flood illuminator to provide illumination while the image sensor captures a two-dimensional and/or three-dimensional image. An infrared camera such as an infrared structured light camera that captures three-dimensional infrared images may have an infrared flood illuminator that emits infrared flood illumination and/or may have a dot projector the emits an array of infrared light beams. Infrared proximity sensors may emit infrared light and detect the infrared light after the infrared light has reflected from a target object.

If desired, electronic device 10 may include additional components (see, e.g., other devices 28 in input-output devices 22). The additional components may include haptic output devices, actuators for moving movable structures in device 10, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
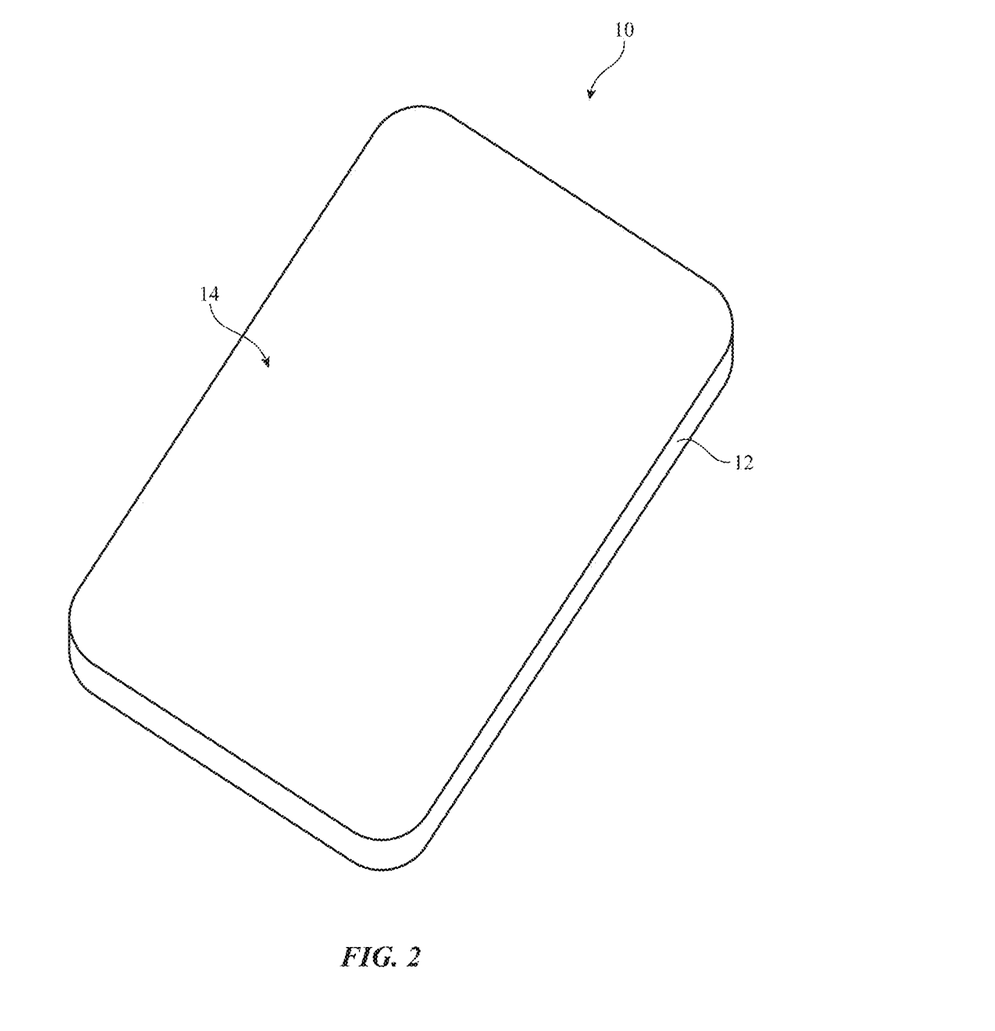
FIG. 2 is a front perspective view of an electronic device of the type shown in FIG. 1 in accordance with some embodiments.

FIG. 2 is a front perspective view of electronic device 10 of the type shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 2, device 10 is a portable device such as a cellular telephone, media player, tablet computer, wrist device, or other portable computing device. Other configurations may be used for device 10 if desired. The example of FIG. 2 is merely illustrative.

In the example of FIG. 2, device 10 includes a display such as display 14 mounted in housing 12. In particular, display 14 (or a transparent cover layer that covers display 14) may be mounted in housing 12 and form at least a portion of a front surface of device 10. Although not shown in FIG. 2, device 10 may also have an opposing rear surface formed by housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may include an array of pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. A display cover layer for display 14 may planar or curved and may have a rectangular outline, a circular outline, or outlines of other shapes. If desired, openings may be formed in the display cover layer. For example, an opening may be formed in the display cover layer to accommodate a button, a speaker port, a sensor, or other component. Openings may be formed in housing 12 to form communications ports (e.g., an audio jack port, a digital data port, etc.), to form openings for buttons, or to form audio ports (e.g., openings for speakers and/or microphones), as examples.

Figure 3:
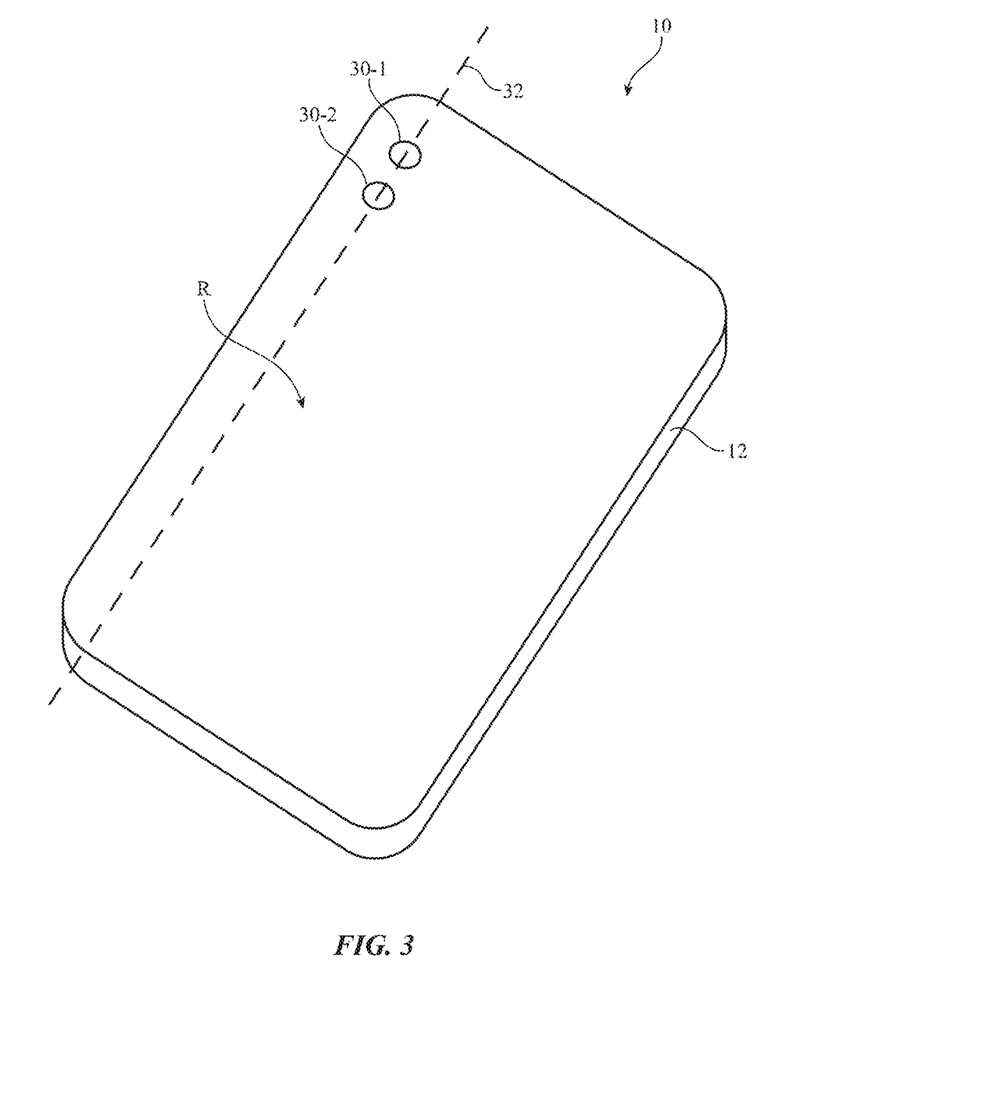
FIG. 3 is a rear perspective view of an electronic device of the type shown in FIGS. 1-2 in accordance with some embodiments.

FIG. 3 is a rear perspective view of electronic device 10 of the type shown in FIGS. 1-2. As shown in FIG. 3, multiple cameras including a first image sensor 30-1 and a second image sensor 30-2 can be disposed at the rear side R of device 10. Image sensors 30-1 and 30-2 are therefore sometimes referred to as rear-facing cameras. Image sensors 30-1 and 30-2 can both be color image sensors (e.g., cameras configured to capture color images). Image sensors 30-1 and 30-2 (and corresponding lenses) can be configured with different fields of view (FoVs). For example, image sensor 30-1 can have a first FoV equivalent to a first focal length, whereas image sensor 30-2 can have a second FoV equivalent to a second focal length that is less than the first focal length (e.g., the second FoV of camera 30-2 can also be greater than the first FoV of camera 30-1). In some embodiments, the first camera 30-1 can be referred to as a wide ("W") image sensor, whereas the second camera 30-2 with an even wider field of view (and shorter focal length) can be referred to as an ultrawide ("UW") image sensor.

Electronic device 10 can have a rectangular shape having a lengthwise dimension that is elongated along a longitudinal axis 32. Image sensors 30-1 and 30-2 can be disposed at different points along the longitudinal axis 32. When device 10 is held upright (e.g., when device 10 is oriented such that its longitudinal axis 32 is orthogonal to the ground), device 10 can be referred to as being operated in a "portrait" orientation such that image sensors 30-1 and 30-2 are positioned on top of or vertically with respect to each other. When device 10 is held sideways (e.g., when device 10 is oriented in a way such that its longitudinal axis 32 is parallel to the ground), device 10 can be referred to as being operated in a "landscape" orientation such that image sensors 30-1 and 30-2 are positioned laterally or horizontally with respect to each other.

The example of FIG. 3 in which device 10 includes two rear-facing cameras is merely illustrative. In general, device 10 may include only one rear-facing camera, two or more rear-facing cameras, three or more rear-facing cameras, four or more rear-facing cameras, four to ten rear-facing cameras, or more than ten rear-facing cameras, each with the same or different fields of view. If desired, image sensors 30-1 and 30-2 can alternatively be disposed along different points of a latitudinal axis that is perpendicular to longitudinal axis 32 across the rear side R of device 10. In certain embodiments, device 10 may also include a plurality of cameras with the same or different fields or view and focal lengths on the front side of the device (see, e.g., FIG. 2). Configurations in which device 10 includes at least a first wide image sensor 30-1 and a second ultra wide image sensor 30-2 configured in the way shown in FIG. 3 are sometimes described herein as an example.

Figure 4:
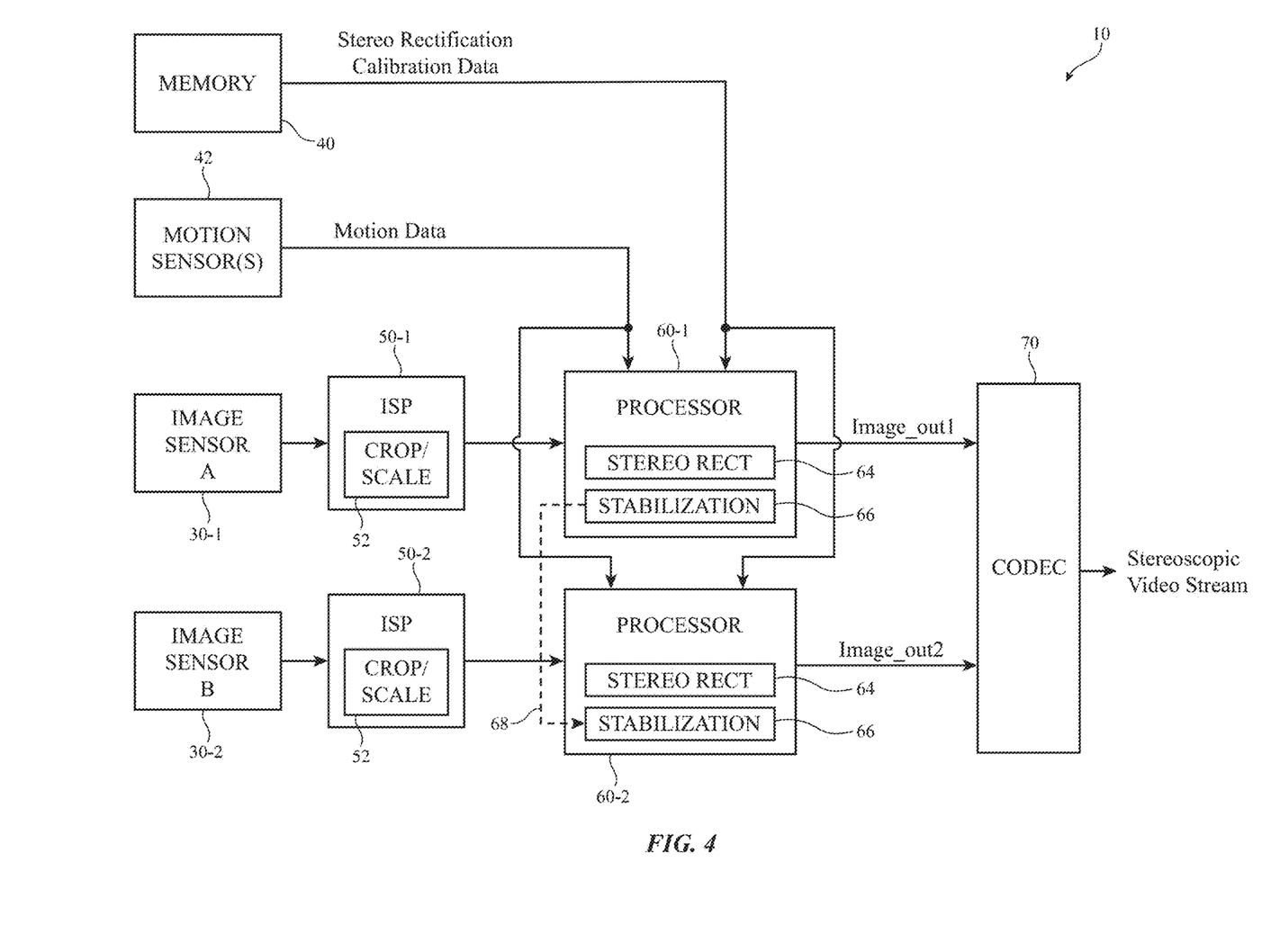
FIG. 4 is a diagram of an illustrative electronic device having image sensors of different focal lengths that are used to generate a stereoscopic video stream in accordance with some embodiments.

In accordance with some embodiments, the multiple cameras on device 10 can be employed to capture stereoscopic content. Stereoscopic content can refer to visual media (e.g., videos or a still image) having a sense of depth and dimensionality by presenting two slightly different perspectives of the same scene to the eyes of a user. FIG. 4 is a diagram showing hardware and/or software subsystems within device 10 that can be used to capture a stereoscope video stream. As shown in FIG. 4, device 10 can include first image sensor 30-1, second image sensor 30-2, image signal processors (ISPs) such as a first image signal processor 50-1 and a second image signal processor 50-2, a first processor downstream of and associated with ISP 50-1 such as first processor 60-1, a second processor downstream of and associated with ISP 50-2 such as second processor 60-2, a codec (coder decoder) block such as codec 70, memory devices such as memory 40, and sensors such as motion sensor 42.

The first image sensor 30-1 (camera A) can be a "wide" camera having a first field of view and a first focal length. The second image sensor 30-2 (camera B) can be an "ultra wide" camera having a second field of view wider than the first field of view and a second focal length that is shorter than the first focal length. This example in which image sensors 30-1 and 30-2 are wide and ultra wide cameras, respectively, is illustrative and is not intended to limit the scope of the present embodiments. In general, two or more image sensors 30 having the same or different fields of view can be used to generate stereoscopic content using the techniques described herein. Image sensor 30-1 may output a first raw (unprocessed) image to image signal processor 50-1, whereas image sensor 30-2 may output a second raw (unprocessed) image to image signal processor 50-2.

Each image signal processor 50 (e.g., ISPs 50-1 and 50-2) can be configured to perform classic image signal processing functions that only rely on the input of the live camera feed itself. For example, each ISP block 50 may be configured to perform automatic exposure (AE), automatic color correction (sometimes referred to as automatic white balancing), tone mapping (e.g., global and/or local tone mapping), gamma correction, shading correction, noise reduction, black level adjustment, demosaicing, image sharpening, high dynamic range (HDR) correction, color space conversion, and/or other image signal processing functions (just to name a few). In the example of FIG. 4, each ISP block 50 can further be configured to crop or downscale the raw images received from the image sensors. For instance, image signal processor 50-1 can receive a first raw image from image sensor 30-1, perform one or more ISP functions described above to obtain a first processed image, and use an internal crop/scaling subblock 52 to crop or downscale the first processed image. Similarly, image signal processor 50-2 can receive a second raw image from image sensor 30-2, perform one or more ISP functions described above to obtain a second processed image, and use an internal crop/scaling subblock 52 to crop or downscale the second processed image.

The first processed image, sometimes referred to herein as a first scaled and processed image, can be conveyed to first downstream processor 60-1. The second processed image, sometimes referred to herein as a second scaled and processed image, can be conveyed to second downstream processor 60-2. The first and second processed images can have different resolutions and different fields of view. Processors 60-1 and 60-2 can each be implemented as a central processing unit (CPU), a graphics processing unit (GPU), a neural processing unit (NPU), a digital signal processor (DSP), a programmable processing unit such as a field programmable gate array (FPGA), and/or other types of processors.

In order for the first and second processed images output from ISP blocks 50-1 and 50-2 to become a stereoscopic pair, processors 60-1 and 60-2 can be configured to perform stereo rectification operations and image stabilization operations on the processed images. As shown in FIG. 4, processors 60-1 and 60-2 can each include subblocks 64 and 66 for performing the stereo rectification and stabilization operations. In one example, the stereo rectification operations can be performed prior to the image stabilization operations. In another example, the stereo rectification operations can be performed after the image stabilization operations. In yet another example, the stereo rectification operations can be performed in parallel (simultaneously) with the image stabilization operations.

Stereo rectification may refer to a process of transforming a pair of stereo images or videos so that corresponding points in the two views lie on the same horizontal scan line. The stereo rectification operations or functions performed by subblocks 64 can produce epipolar alignment (e.g., so that epipolar lines are horizontal). Stereo rectification (sometimes referred to as "stereo alignment") may refer to the process of aligning a pair of images or videos so that corresponding points in the two views so that the corresponding points in the two views line on the same horizontal scan line. Stereo alignment can be accomplished by finding the translation and/or rotation between the two views and then using this information to warp both of the images.

To perform stereo rectification, processors 60-1 and 60-2 can receive stereo rectification calibration data that is stored on memory 40. Memory 40 may be nonvolatile memory, volatile memory, and/or other types of storage that is part of circuitry 16 in FIG. 1. The stereo rectification calibration data can include extrinsic calibration data of image sensor 30-1 and/or image sensor 30-2. "Extrinsic" calibration data may refer to and be defined herein as data associated with the six degrees of freedom (6 DOF) of an image sensor in the 3D space. For example, the extrinsic calibration data can include information relating to the rotational orientation of an image sensor (e.g., the pitch, roll, and yaw) and the translational positioning of an image sensor (e.g., the forward/backward displacement, up/down displacement, and left/right displacement).

In contrast, "intrinsic" data can refer and be defined herein as data relating to how world coordinates are being projected onto an image sensor (e.g., how 3D data is translated to 2D data). For example, intrinsic camera data can include the focal length of an image sensor, an optical center of an image sensor, a skew associated with an image sensor, and/other intrinsic metrics that can potentially vary from frame-to-frame. If desired, intrinsic data relating to image sensor 30-1 and/or 30-2 can also be stored in memory 40. In some embodiments, memory 40 can store and provide extrinsic calibration data (e.g., stereo rectification calibration data) associated with image sensor 30-1 and/or image sensor 30-2 and intrinsic calibration sensor data of both image sensors 30-1 and 30-2 to processors 60-1 and 60-2.

With respect to image stabilization, the stabilization (and pose) information associated with the first image sensor 30-1 can be used to stabilize the image output from image sensor 30-2 to ensure that stabilization between the two cameras are synchronized. As shown by dotted line 68, stabilization information for the first image sensor 30-1 can be applied to the second processed image captured using second image sensor 30-2. Here, the stabilization/pose information associated with sensor 30-1 can be applied to the output of sensor 30-2. This is exemplary. As another example, the stabilization/pose information from the ultra wide sensor 30-2 can alternatively be applied to the output of sensor 30-1. As another example, each image sensor 30 can rely on its own image stabilization/pose information. Device configurations in which the stabilization/pose information associated with image sensor 30-1 is applied to the output of image sensor 30-2 are sometimes described herein as an example.

The pose information that is used for the image stabilization algorithms in subblocks 66 may be obtained using one or more motion sensor 42. Motion sensor(s) 42 may output motion data associated with image sensor 30-1 and/or 30-2. Motion sensor(s) 42 may be considered part of sensors 26 in FIG. 1. As an example, motion sensor(s) 42 can include visual inertial odometry (VIO) sensors for gathering information used to track an orientation and position of device 10. VIO sensors can include inertial measurement units (e.g., gyroscopes, gyrocompasses, accelerometers, magnetometers, and/or other inertial sensors), one or more tracking cameras, and/or other position and motion sensors. Motion sensor 42 may directly determine the pose, movement, yaw, pitch, roll, etc. of an image sensor.

Motion sensor 42 can also be used to determine a current orientation and position of device 10 within the environment. Sensors 42 is thus sometime also referred to as a position sensor. As an example, a first motion sensor 42 can provide motion data associated with first image sensor 30-1 to stabilization subblock 66 in processor 60-1, whereas a second motion sensor 42 can provide motion data associated with second image sensor 30-2 to stabilization subblock 66 in processor 60-2. The motion data output by such types of motion sensors 42 can also be considered "extrinsic" (non-calibration) camera data.

Processors 60-1 and 60-2 configured to perform stereo rectification and image stabilization operations in this way are sometimes referred to as stereo rectification (alignment) and stabilization processors. Processor 60-1 may output a first rectified and stabilized image (labeled Image_out1 in FIG. 4) to a first input of codec block 70. Processor 60-2 may output a second rectified and stabilized image (labeled Image_out2) to a second input of codec block 70. Unlike the first and second processed images received at the inputs of processors 60-1 and 60-2, which can have different resolutions and different fields of view, the first and second rectified (aligned) and stabilized images generated at the outputs of processors 60-1 and 60-2 can exhibit the same resolution and the same field of view (e.g., the images provided to the inputs of the codec block 70 can have the same focal length without any camera or lens distortion).

Codec block 70 can, for example, be configured to implement MV-HEVC (Multiview High Efficiency Video Coding), which is a video compression protocol designed to provide efficient data compression for multi-view video content. Codec block 70 can therefore generate a MV-HEVC video stream based on a series of first and second rectified and stabilized images received from processors 60-1 and 60-2. MV-HEVC is an extension to the HEVC standard that supports the encoding of multiple views of a captured scene into a single data stream. MV-HEVC achieves efficient compression by exploiting similarities between different views of a scene. For example, an interview prediction scheme can allow the motion and texture information from one view to predict the motion and texture of another view. This prediction scheme can reduce redundancy in the data and can improve compression efficiency. Codec block 70 is therefore sometimes referred to as a video compression block.

This example in which codec block 70 implements MV-HEVC is illustrative. If desired, codec 70 can be configured to implement other types of multi-view encoding schemes to generate a stereoscopic video stream. The stereoscopic video stream can optionally be stored on a cloud in a remote or local database and played back on a device having one or more displays capable of presenting stereoscopic video content. As an example, the stereoscopic video stream can be played back on a head-mounted device having one or more displays for creating a sense of depth and 3D experience to a user. The various blocks shown in FIG. 4 such as blocks 50-1, 50-2, 60-1, 60-2, and 70 can be referred to collectively as control circuitry (see, e.g., control circuitry 14 in FIG. 1).

Device 10 (e.g., a cellular phone) and a head-mounted device can have different viewing conditions. For example, device 10 can be operated in a non-immersive viewing condition, whereas a head-mounted device can be operated in an immersive viewing condition that tends to be much darker. The stereoscopic video stream captured by device 10 can be provided with metadata including a chromatic adaptation matrix that is adapted to the non-immersive viewing condition. Since the viewing condition of the head-mounted device is different than that of device 10, the head-mounted device can optionally color correct the stereoscopic content captured using device 10 using a modified version of the chromatic adaptation matrix included in the metadata. If the stereoscopic content captured using device 10 is viewed on another device in the non-immersive viewing condition, that device can simply apply the same chromatic adaptation matrix included in the metadata to the stereoscopic content being displayed.

Figure 5:
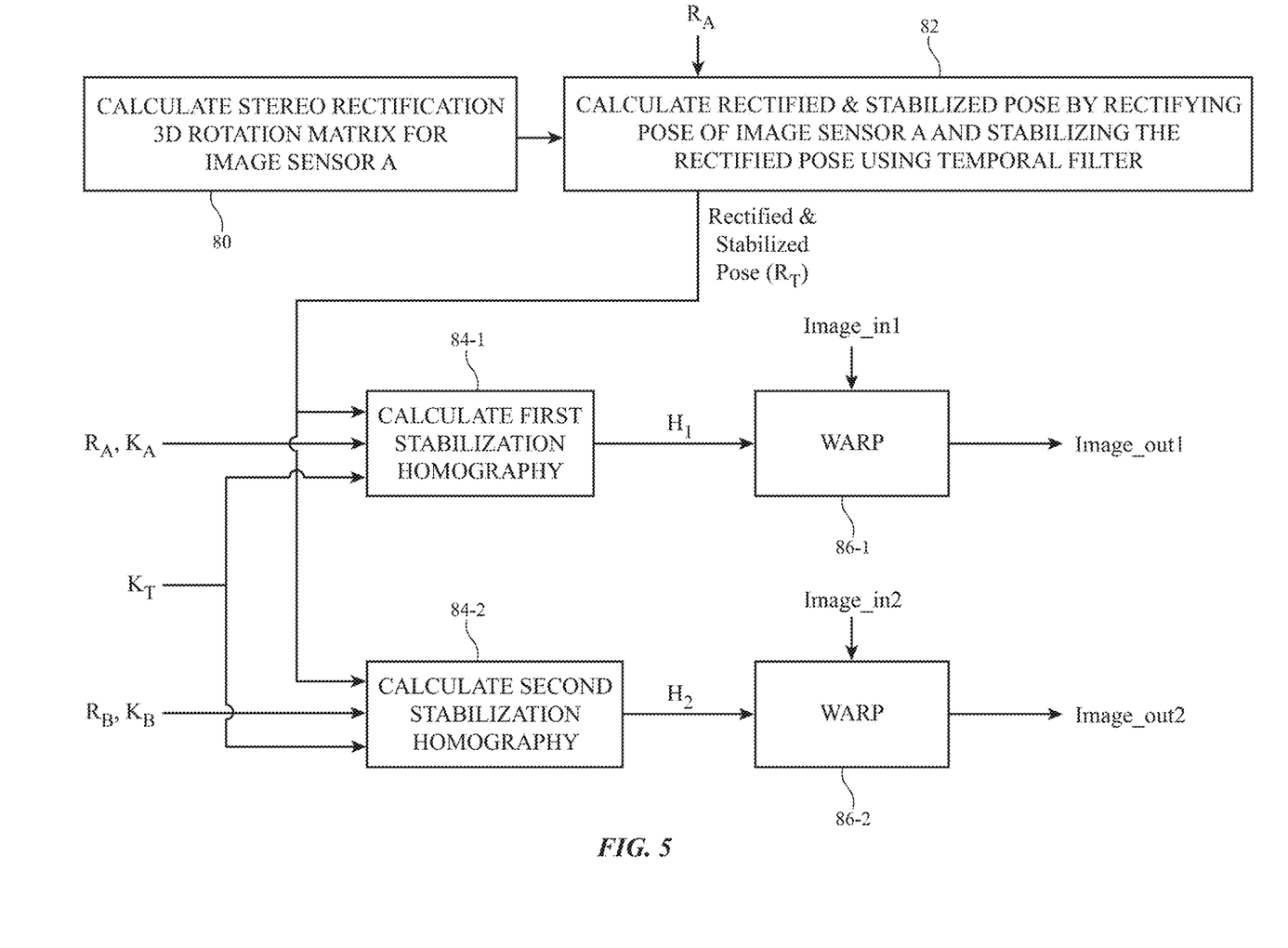
FIG. 5 is a diagram of illustrative operations for warping images from two image sensors in accordance with some embodiments.

FIG. 5 is a diagram showing illustrative operations that can be performed using the stereo rectification (alignment) and image stabilization processors 60-1 and 60-2. In the operations of block 80, a stereo rectification 3D rotation matrix can be computed for image sensor 30-1. The stereo rectification 3D rotation matrix may be a fixed matrix that is computed based on extrinsic calibration data associated with image sensor 30-1 and/or image sensor 30-2. In the operations of block 82, a rectified and stabilized pose can be calculated by (1) rectifying the pose from image sensor 30-1 and then (2) stabilizing the rectified pose of image sensor 30-1 (e.g., using a temporal filter). This rectified and stabilized pose (defined herein as "$R_T$") can be computed on a frame-by-frame basis. The rectified and stabilized pose can be computed based on the rotation matrix computed from block 80 and based on rotation data associated with image sensor 30-1, defined herein as "$R_A$" and optionally expressed in world coordinates, as provided from motion sensor(s) 42. The operations of block 80 and 82 can be performed by processor 60-1.

During the operations of block 84-1, a first stabilization homography $H_1$ can be computed for image sensor 30-1. A homography can generally refer to a mathematical transformation that maps points in one plane to corresponding points in another plane. A homography can be used to describe the relationship between two images of the same scene taken from different angle or perspective. A homography can sometimes be expressed as a matrix that is used to project a point in one image onto a corresponding point in another image based on intrinsic and extrinsic parameters of an image sensor.

In the example of FIG. 5, the first stabilization homography $H_1$ can be calculated based on the rectified and stabilized pose $R_T$ computed from block 82, rotation or motion data associated with image sensor 30-1 (defined herein as "$R_A$") as provided by motion sensor(s) 42, intrinsic calibration sensor data associated with image sensor 30-1 (defined herein as "$K_A$") as provided from memory 40, and intrinsic sensor data associated with a target image sensor (defined herein as "$K_T$" and sometimes referred to as intrinsic target sensor data) as provided from memory 40. The intrinsic calibration sensor data $K_A$ can, for example, include the focal length and/or optical center point of image sensor 30-1. The intrinsic target sensor data $K_T$ can be equal to or different than the intrinsic calibration sensor data $K_A$ of sensor 30-1. For example, the optical center of the target camera can be dynamically set equal to the optical center of image sensor 30-1 or can be statically set to the center of an image. The first stabilization homography $H_1$ can be computed as follows:

$$H_1 = K_A R_A (R_T)^{-1} (K_T)^{-1} \qquad (1)$$

The first stabilization homography $H_1$ computed from block 84-1 can be used as a warp mesh to perform a first warping function at block 86-1. The warping function can, for example, be a bicubic warping function for interpolating between related pixels. The warping operation 86-1 can take Image_in1 as an input (e.g., the processed image received from the output of image signal processor 50-1) and then warp Image_in1 using homography $H_1$ to generate a corresponding first rectified and stabilized image Image_out1. Configured in this way, the rectification (alignment) and stabilization are applied together in a single operation to warp the image. The operations of blocks 84-1 and 86-1 can be performed by processor 60-1.

The second stabilization homography $H_2$ can be calculated based on the rectified and stabilized pose $R_T$ computed from block 82, rotation data associated with image sensor 30-2 (defined herein as "$R_B$") as provided by motion sensor(s) 42, intrinsic calibration sensor data associated with image sensor 30-2 (defined herein as "$K_B$") as provided from memory 40, and intrinsic sensor data $K_T$ associated with the target image sensor as provided from memory 40. The intrinsic calibration sensor data $K_B$ can, for example, include the focal length and/or optical center point of image sensor 30-2. The second stabilization homography $H_2$ can be computed as follows:

$$H_2 = K_B R_B (R_T)^{-1} (K_T)^{-1} \qquad (2)$$

The second stabilization homography $H_2$ computed from block 84-2 can be used as a warp mesh to perform a second warping function at block 86-2. The warping function can, for example, be a bicubic warping function for interpolating between related pixels. The warping operation 86-2 can take Image_in2 as an input (e.g., the processed image received from the output of image signal processor 50-2) and then warp Image_in2 using homography $H_2$ to generate a corresponding second rectified and stabilized image Image_out2. Configured in this way, the rectification (alignment) and stabilization are applied together in a single operation to warp the image. The operations of blocks 84-2 and 86-2 can be performed by processor 60-2. Unlike the first and second processed images Image_in1 and Image_in2 received at the inputs of processors 60-1 and 60-2, which can have different resolutions and different fields of view, the first and second rectified (aligned) and stabilized images Image_out1 and Image_out2 generated at the outputs of processors 60-1 and 60-2 can exhibit the same resolution and the same field of view (e.g., the warped images can have the same focal length without any camera or lens distortion).

Figure 6:
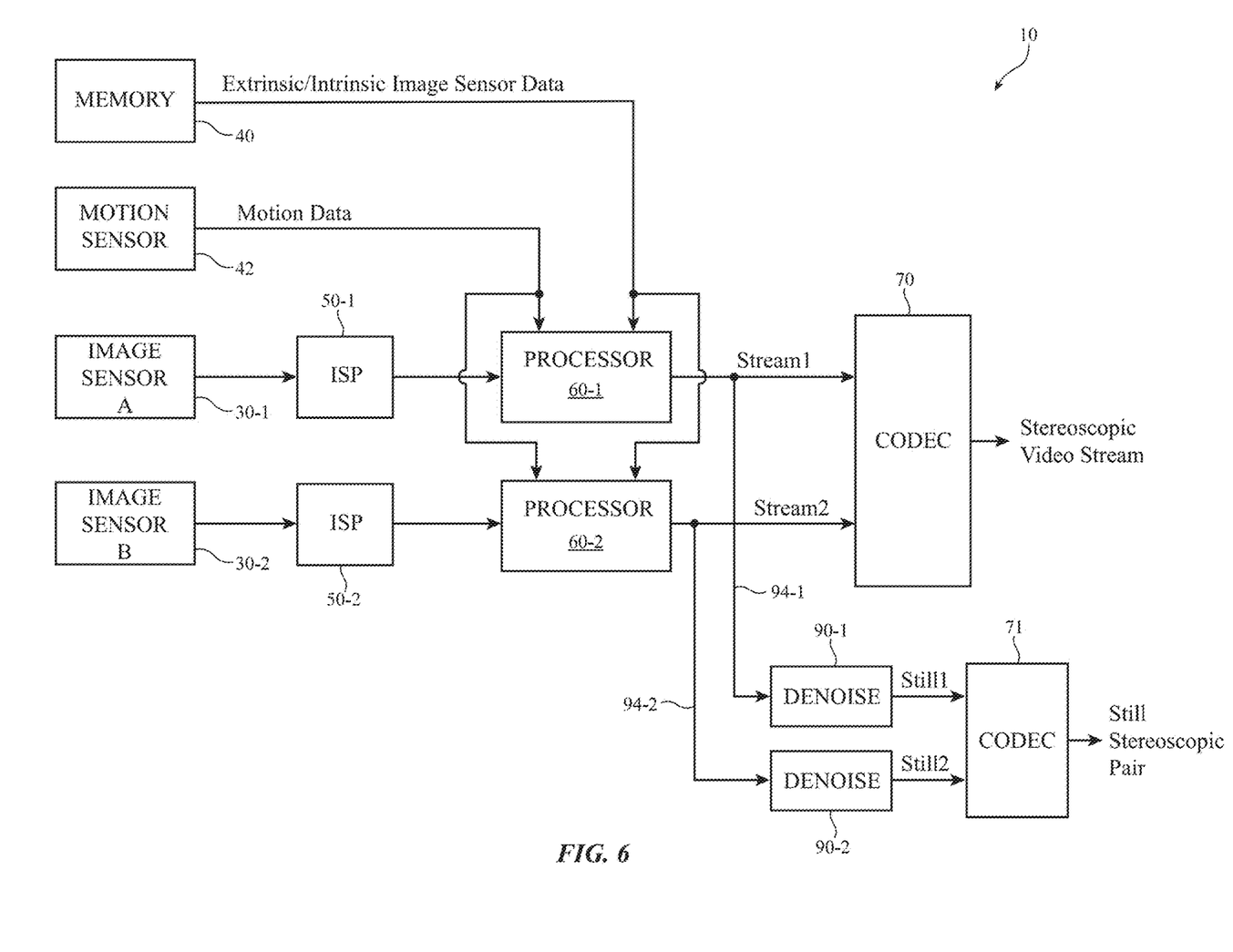
FIG. 6 is a diagram showing additional subsystems configured to generate a still stereoscopic image in accordance with some embodiments.
Figure 7:
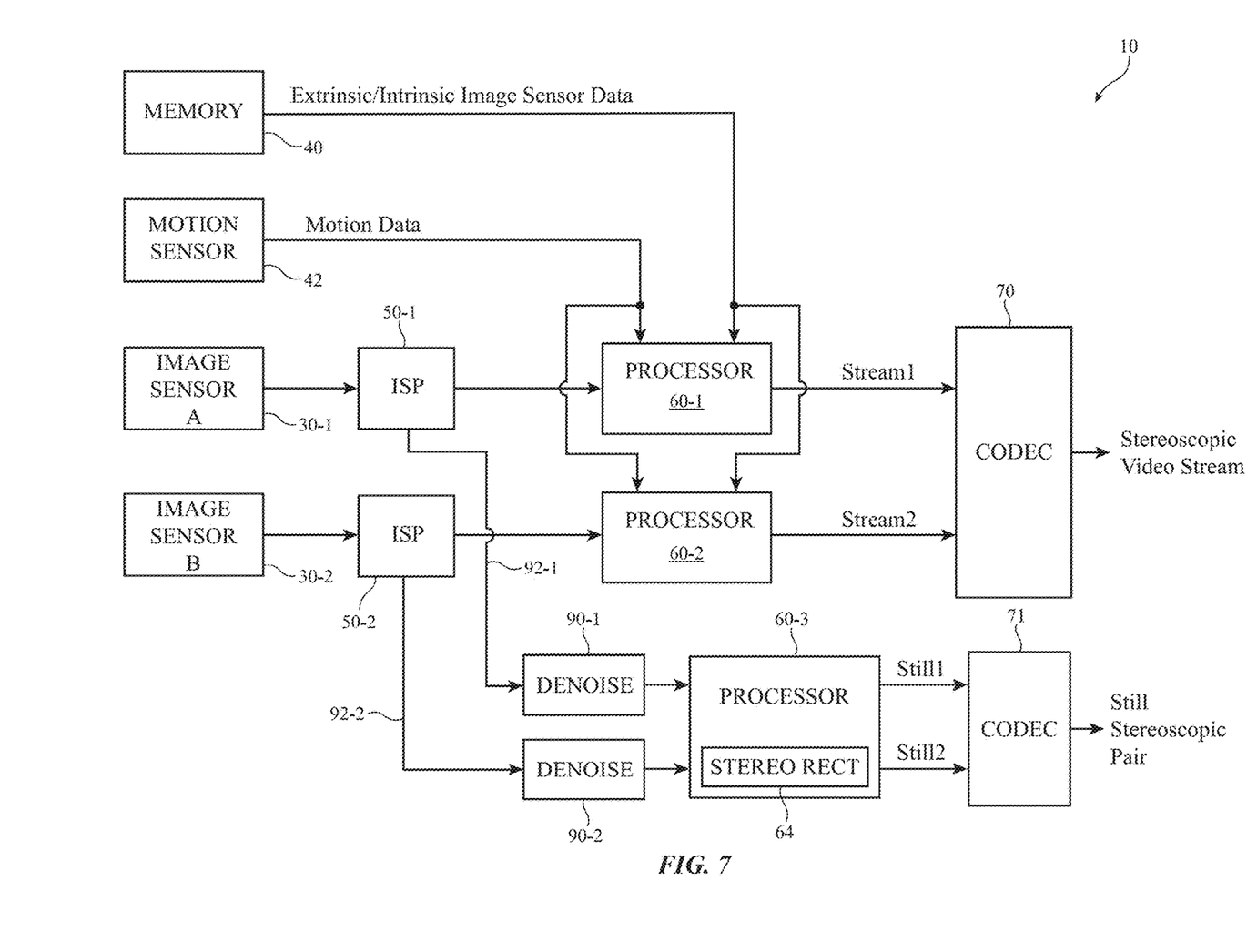
FIG. 7 is a diagram showing additional subsystems coupled to image signal processors and configured to generate a still stereoscopic image in accordance with some embodiments.

The embodiments of FIGS. 4-5 showing hardware and software subsystems configured to generate a stereoscopic video stream are illustrative. FIGS. 6 and 7 show other embodiments that include additional circuitry for outputting stereoscopic still images (e.g., an image that captures a single moment in time rather than a sequence of images). As shown in FIG. 6, electronic device 10 can further include additional processing blocks such as a first denoising block 90-1, a second denoising block 90-2, and codec block 71. First denoising block 90-1 may have an input coupled to the output of processor 60-1 via data path 94-1, can perform a software based multiband noise reduction (as an example) to produce a first still image Still1. Second denoising block 90-2 may have an input coupled to the output of processor 60-2 via data path 94-2, can perform a software based multiband noise reduction (as an example) to produce a second still image Still2. If the image resolution of Still1 and Still2 are insufficient, additional upscaling or super-resolution processing blocks can be included to increase the resolution of Still1 and Still2. Images Still1 and Still2 can be fed to inputs of codec block 71. Denoising blocks 90-1 and 90-2 in FIG. 6 are optional. In general, blocks 90-1 and 90-2 can be omitted or can be replaced with other image enhance block(s) configured to perform denoising and upscaling operations.

Codec block 71 can, for example, be configured to implement HEVC (High Efficiency Video Coding), which is a video compression protocol designed to provide efficient data compression for video content. Codec block 71 can, for example, generate a corresponding still stereoscopic pair (or stereoscopic image pair) using the HEIC (High Efficiency Image Format). This is merely illustrative. If desired, codec block 71 can generate a still stereoscopic image pair compressed using the JPEG (Joint Photographics Expert Group) image format, PNG (Portable Network Graphics) image format, GIF (Graphics Interchange Format), TIFF (Tagged Image File Format), and/or other image formats. Codec 71 is therefore sometimes referred to as an image compression block. If desired, codec 71 can be configured to implement other types of encoding schemes to generate a stereoscopic image pair. The still stereoscopic pair can optionally be stored on a cloud in a remote or local database and played back on a device having one or more displays capable of presenting stereoscopic video content. As an example, the stereoscopic video stream can be played back on a head-mounted device having one or more displays for displaying slightly different content to create a sense of depth and 3D experience to a user.

The example of FIG. 6 in which the stills generation circuitry (e.g., blocks 90-1, 90-2, and codec 71) taps into the rectified and stabilized images output from processors 60-1 and 60-2 is illustrative. FIG. 7 shows another example in which the stills generation circuitry is coupled directly to the image signal processors 50. As shown in FIG. 7, device 10 can further include a first denoising block 90-1, a second denoising block 90-2, a third processor 60-3, and a codec block 71. The first denoising block 90-1 may have an input coupled to ISP 50-1 via data path 92-1 and can perform a software based multiband noise reduction (as an example). The second denoising block 90-2 may have an input coupled to the output of ISP 50-2 via data path 92-2 and can perform a software based multiband noise reduction (as an example). The images (e.g., still images) output on paths 92-1 and 92-2 can be generated on demand by ISPs 50-1 and 50-2. Denoising blocks 90-1 and 90-2 of FIG. 7 are optional. In general, blocks 90-1 and 90-2 can be omitted or can be replaced with other image enhancement block(s) configured to provide denoising and upscaling functions.

Processor 60-3 may have inputs coupled to denoising blocks 90-1 and 90-2. Processors 60-3 can be implemented as a central processing unit (CPU), a graphics processing unit (GPU), a neural processing unit (NPU), a digital signal processor (DSP), a programmable processing unit such as a field programmable gate array (FPGA), and/or other types of processors. Unlike processors 60-1 and 60-2, which can be configured to perform both stereo rectification and image stabilization functions, processor 60-3 can be configured to perform only stereo rectification functions (see subblock 64). Processor 60-3 need not perform any image stabilization. Processor 60-3 can perform stereo rectification (e.g., using a rotation matrix associated with image sensor 30-1 and/or other extrinsic calibration data) based on the output from denoising blocks 90-1 and 90-2 to output still images Still1 and Still2. Since the images output from ISPs 50-1 and 50-2 are relatively high resolution, no additional upscaling or super-resolution processing blocks are needed. If desired, however, upscaling or super-resolution processing blocks can be included to boost the resolution of Still1 and Still2. Images Still1 and Still2 can be fed to inputs of codec block 71.

Codec block 71 can, for example, be configured to implement HEVC (High Efficiency Video Coding), which is a video compression protocol designed to provide efficient data compression for video content. Codec block 71 can, for example, generate a corresponding still stereoscopic pair (or stereoscopic image pair) using the HEIC (High Efficiency Image Format). This is merely illustrative. If desired, codec block 71 can generate a still stereoscopic image pair compressed using the JPEG (Joint Photographics Expert Group) image format, PNG (Portable Network Graphics) image format, GIF (Graphics Interchange Format), TIFF (Tagged Image File Format), and/or other image formats. If desired, codec 71 can be configured to implement other types of encoding schemes to generate a stereoscopic image pair. The still stereoscopic pair can optionally be stored on a cloud in a remote or local database and played back on a device having one or more displays capable of presenting stereoscopic video content. As an example, the stereoscopic video stream can be played back on a head-mounted device having one or more displays for displaying slightly different content to create a sense of depth and 3D experience to a user. The various blocks shown in FIG. 7 such as blocks 50-1, 50-2, 60-1, 60-2, 60-3, 70, 71, 90-1 and 90-2 can be referred to collectively as control circuitry (see, e.g., control circuitry 14 in FIG. 1)

Figure 8:
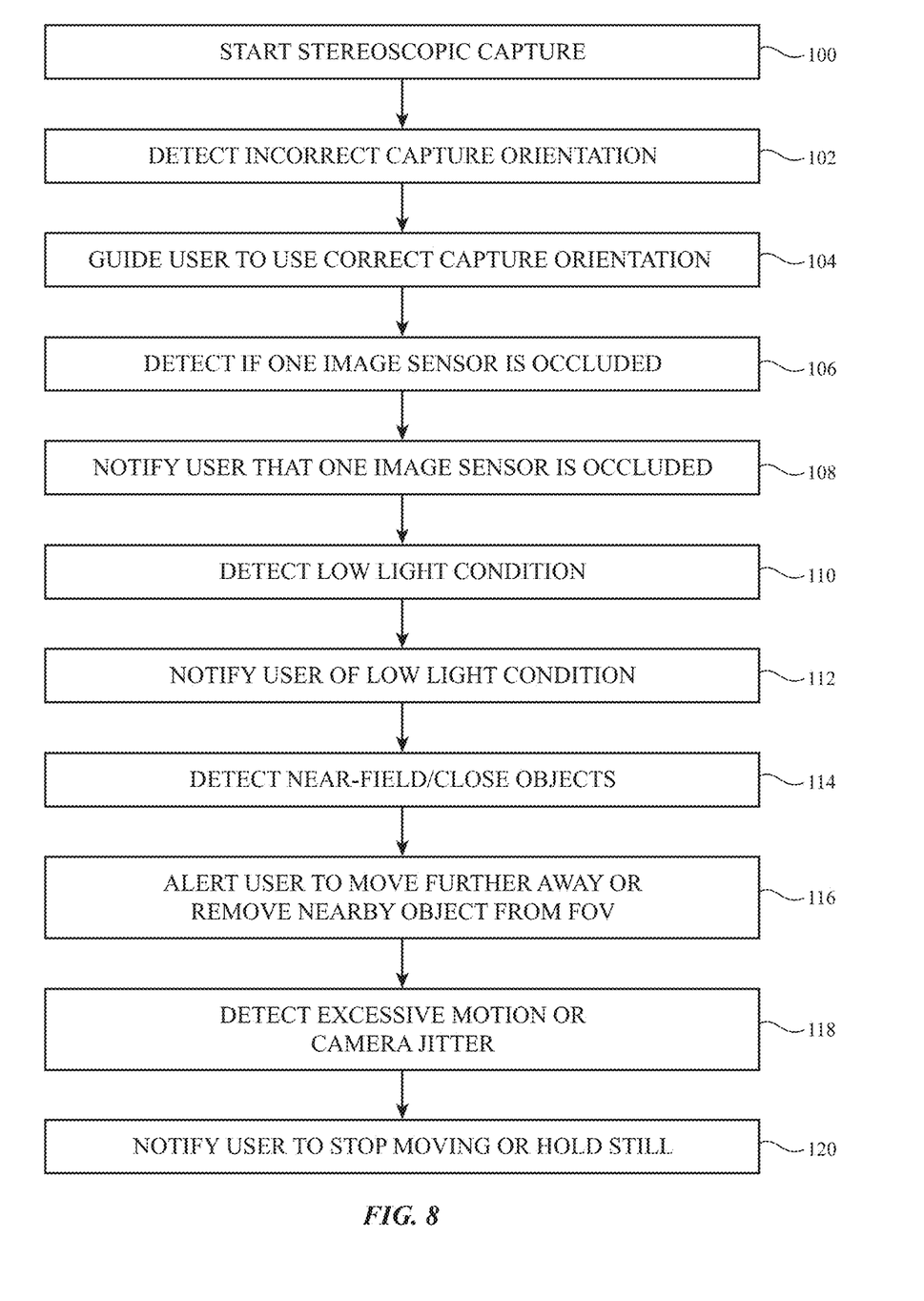
FIG. 8 is a flow chart of illustrative steps for operating an electronic device of the type shown in FIGS. 1-7 in accordance with some embodiments.

FIG. 8 is a flow chart of illustrative steps for operating an electronic device 10 of the type shown in FIGS. 1-7 in accordance with some embodiments. During the operations of block 100, device 10 can be operated to start a stereoscopic capture. For example, device 10 can be operated to capture a stereoscopic video stream (e.g., using the circuitry and processes described in connection with FIGS. 4-5) and/or to capture a stereoscopic still image (e.g., using the circuitry and processes described in connection with FIGS. 6-7).

During the operations of block 102, device 10 can optionally detect an incorrect stereoscopic capture orientation. For example, device 10 might use one or more motion sensors or inertial measurement units to determine whether device 10 is currently held in a portrait orientation or a landscape orientation. Assuming the rear-facing cameras 30-1 and 30-2 are disposed in the way shown in FIG. 3, stereoscopic capture should be carried out when device 10 is in the landscape orientation. Thus, when device 10 detects that device 10 is in the portrait orientation, device 10 can issue a notification to guide the user to use the correct capture orientation (e.g., to output a user alert to switch to the landscape orientation, as shown by the operations of block 104). If device 10 is already in the correct (landscape) orientation, block 104 can be skipped.

During the operations of block 106, device 10 can optionally detect whether one of the image sensors used for the stereoscopic capture is currently occluded. For example, device 10 can analyze and compare thumbnail information, integration time, local and/or global brightness information, color information, focus information, and/or other image statistics between the images captured by the two cameras to determine whether one of the cameras is occluded. In response to determining that one of the cameras is currently occluded, device 10 can notify the user that one of the image sensors is occluded (see operations of block 108), and the user can be provided with an opportunity to remove that occlusion. For example, the user can move or turn away from an obstacle that might be blocking one of the cameras, can move his/her finger that might be currently blocking one of the cameras, can wipe away a smudge or smear that might be covering one of the cameras, etc. If none of the image sensors is occluded, block 108 can be skipped. The example of FIG. 8 in which blocks 106/108 are performed after blocks 102/104 is merely illustrative. If desired, blocks 106/108 can be performed before or in parallel with the operations of blocks 102/104.

During the operations of block 110, device 10 can optionally detect a low light condition. For example, device 10 can analyze the brightness information gathered by one of image sensors 30-1 and 30-2, by an ambient light sensor, and/or by other optical sensor to determine an ambient light level of the scene being captured. If the ambient light (lux) level of the scene being captured is below a certain threshold, device 10 can notify the user of the low light condition (see block 112). The user can be provided with an opportunity to add additional lighting, to move to an area with better lighting conditions, and/or to otherwise improve the lighting condition to improve the quality of the stereoscopic content being captured. If the ambient light level of the scene being captured is greater than the threshold, block 112 can be skipped. The example of FIG. 8 in which blocks 110/112 are performed after blocks 106/108 is merely illustrative. If desired, blocks 110/112 can be performed before or in parallel with the operations of blocks 106/108 or blocks 102/104.

During the operations of block 114, device 10 can optionally detect a near-field (close) object that is within a field of view of one of image sensors 30-1 and 30-2. In response to detecting a near-field object within the field of view of one of the rear-facing cameras being used to capture the stereoscopic content, device 10 can output an alert to the user to move further away or to remove the nearby object so that the object is no longer in the field of view of one of image sensors 30-1 and 30-2 (see block 116). If there is no near-field object detected, then block 116 can be skipped. The example of FIG. 8 in which blocks 114/116 are performed after blocks 110/112 is merely illustrative. If desired, blocks 114/116 can be performed before or in parallel with the operations of blocks 110/112, 106/108, or blocks 102/104.

During the operations of block 118, device 10 can optionally detect if it is moving excessively or if there is an elevated level of camera jitter. For example, the detected movement or camera jitter can be compared to a threshold level. In response to detecting excessive motion or excessive camera jitter, device 10 can notify the user to stop moving as much or to hold still (see operations of block 120). The example of FIG. 8 in which blocks 118/120 are performed after blocks 114/116 is merely illustrative. If desired, blocks 118/120 can be performed before or in parallel with the operations of blocks 114/116, 110/112, 106/108, or blocks 102/104.

The operations of FIG. 8 are merely illustrative. The various blocks 102-120 can all serve to improve the quality of the stereoscopic content. If desired, other steps for improving the quality of the stereoscopic video or image can be employed. If desired, additional steps for detection a far-field object can be included. If desired, additional steps for detecting camera jitter or shake (and associated alert prompting the user to hold still) can be included. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 14 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 14). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating an electronic device comprising:
capturing a first image using a first image sensor having a first field of view;
capturing a second image using a second image sensor having a second field of view different than the first field of view;
processing the first image using a first image signal processor to output a first processed image;
processing the second image using a second image signal processor to output a second processed image;
performing stereo rectification and image stabilization operations on the first and second processed images to output corresponding first and second rectified and stabilized images by obtaining a rotation matrix associated with the first image sensor and calculating a rectified and stabilized pose based on the rotation matrix and motion data associated with the first image sensor; and
outputting stereoscopic content based on the first and second rectified and stabilized images.

2. The method of claim 1,
wherein processing the first image using the first image signal processor comprises cropping and scaling the first image, and
wherein processing the second image using the second image signal processor comprises cropping and scaling the second image.

3. The method of claim 1, further comprising:
compressing the first and second rectified and stabilized images using a multiview video encoding scheme to generate a stereoscope video stream.

4. The method of claim 1, wherein performing the stereo rectification and image stabilization operations on the first and second processed images comprises:
obtaining stabilization information for the first image sensor; and
synchronizing image stabilization between the first and second image sensors by applying the stabilization information for the first image sensor to the second processed image captured using the second image sensor.

5. The method of claim 1, wherein calculating the rectified and stabilized posed comprises:
rectifying a pose of the first image sensor; and
stabilizing the rectified posed of the first image sensor using a temporal filter.

6. The method of claim 1, further comprising:
calculating a first homography based on the rectified and stabilized pose, the motion data associated with the first image sensor, intrinsic data associated with the first image sensor, and intrinsic data associated with a target image sensor.

7. The method of claim 6, further comprising:
calculating a second homography based on the rectified and stabilized pose, motion data associated with the second image sensor, intrinsic data associated with the second image sensor, and the intrinsic data associated with the target image sensor.

8. The method of claim 7, further comprising:
warping the first processed image using the first homography to generate the first rectified and stabilized image; and
warping the second processed image using the second homography to generate the second rectified and stabilized image.

9. The method of claim 8, further comprising generating a still stereoscopic pair by
denoising and upscaling the first rectified and stabilized image to output a first still image,
denoising and upscaling the second rectified and stabilized image to output a second still image, and
compressing the first and second still images.

10. The method of claim 8, further comprising generating a still stereoscopic pair by
denoising and upscaling a first additional image obtained from the first image signal processor,
denoising and upscaling a second additional image obtained from the second image signal processor,
performing stereo rectification on the first and second additional images to output first and second still images, and
compressing the first and second still images.

11. An electronic device comprising:
a first camera having a first field of view and configured to capture a first image;
a second camera having a second field of view different than the first field of view and configured to capture a second image; and
control circuitry configured to:
output stereoscopic content based on the first image captured from the first camera having the first field of view and the second image from the second camera having the second field of view different than the first field of view;
denoise and upscale a first processed image generated based on the first image to produce a first still image;
denoise and upscale a second processed image generated based on the second image to produce a second still image; and
compressing the first and second still images.

12. The electronic device of claim 11, wherein the control circuitry comprises:
a first image signal processor configured to receive the first image captured by the first camera and to output the first processed image; and
a second image signal processor configured to receive the second image captured by the second camera and to output the second processed image.

13. The electronic device of claim 12, wherein the control circuitry further comprises:
a first additional processor configured to receive the first processed image, motion data associated with the first camera, and first calibration data and further configured to generate a first rectified and stabilized image; and
a second additional processor configured to receive the second processed image, motion data associated with the second camera, and second calibration data and further configured to generate a second rectified and stabilized image.

14. The electronic device of claim 13, wherein the control circuitry further comprises:
a video compression block configured to receive the first and second rectified and stabilized images and to generate a corresponding stereoscopic video stream.

15. The electronic device of claim 13, wherein the control circuitry further comprises:
a first image enhancement block configured to denoise and upscale the first rectified and stabilized image to produce the first still image;
a second image enhancement block configured to denoise and upscale the second rectified and stabilized image to produce the second still image; and
an image compression block coupled to outputs of the first and second denoising blocks.

16. The electronic device of claim 13, wherein the control circuitry further comprises:
a first image enhancement block configured to receive a first additional image from the first image signal processing block and to perform denoising and upscaling operations;
a second image enhancement block configured to receive a second additional image from the second image signal processing block and to perform denoising and upscaling operations;
a third additional processor coupled to outputs of the first and second denoising blocks and configured to perform stereo rectification operations to output the first and second still images;
an image compression block configured to receive the first and second still images from the third additional processor.

17. A method of operating an electronic device comprising:
capturing a first image using a first camera with a first field of view;
capturing a second image using a second camera with a second field of view different than the first field of view;
generating stereoscopic content based on the first and second captured images; and
outputting a user notification to improve a quality of the stereoscopic content, wherein outputting the user notification to improve the quality of the stereoscopic content comprises:
detecting an incorrect stereoscopic capture orientation of the electronic device; and
in response to detecting the incorrect stereoscopic capture orientation of the electronic device, outputting a user notification to switch to a correct stereoscopic capture orientation.

18. The method of claim 17, wherein outputting the user notification to improve the quality of the stereoscopic content further comprises:
detecting whether the first camera is occluded; and
in response to detecting that the first camera is occluded, outputting a user notification that the first camera is occluded.

19. The method of claim 17, wherein outputting the user notification to improve the quality of the stereoscopic content further comprises:
detecting a lighting condition of the first or second image; and
in response to detecting that the detected lighting is below a threshold, outputting a user notification that the lighting condition is below the threshold.

20. The method of claim 17, wherein outputting the user notification to improve the quality of the stereoscopic content further comprises:
detecting an external object within the field of view of the first camera; and
in response to detecting the external object within the field of view of the first camera, outputting a user notification that the external object is within the field of view of the first camera.

21. The method of claim 17, wherein outputting the user notification to improve the quality of the stereoscopic content further comprise:
detecting motion or jitter of the first and second cameras; and
in response to detecting motion or jitter of the first and second cameras, outputting a user notification to stop moving or hold still.

22. A method of operating an electronic device comprising:
capturing a first image using a first image sensor having a first field of view;
capturing a second image using a second image sensor having a second field of view different than the first field of view;
with a first image signal processor, cropping and scaling the first image to produce a first processed image having a first resolution;
with a second image signal processor, cropping and scaling the second image to produce a second processed image having a second resolution different than the first resolution;
warping the first processed image to produce a first rectified and stabilized image having a third resolution and a third field of view;
warping the second processed image to produce a second rectified and stabilized image having the third resolution and the third field of view; and
outputting stereoscopic content based on the first rectified and stabilized image and the second rectified and stabilized image.

23. The method of claim 22, further comprising:
compressing the first and second rectified and stabilized images using a multiview video encoding scheme to generate a stereoscope video stream for display.

24. The method of claim 22, further comprising:
obtaining stabilization information for the first image sensor; and
synchronizing image stabilization between the first and second image sensors by applying the stabilization information for the first image sensor to the second processed image captured using the second image sensor.

25. The method of claim 22, further comprising:
obtaining a rotation matrix associated with the first image sensor; and
calculating a rectified and stabilized pose of the first image sensor based on the rotation matrix and motion data associated with the first image sensor.

* * * * *